United States Patent
Sim (10) Patent No.: US 7,788,141 B1
(45) Date of Patent: Aug. 31, 2010

(54) METHOD AND SYSTEM FOR TRACKING PURCHASES

(75) Inventor: Joanna Sim, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 124 days.

(21) Appl. No.: 12/130,975

(22) Filed: May 30, 2008

(51) Int. Cl.
*G06Q 30/00* (2006.01)
*G06F 17/30* (2006.01)

(52) U.S. Cl. .............. 705/26; 705/27; 705/14.18; 705/14.34; 705/14.21

(58) Field of Classification Search .............. 705/26, 705/27, 14.18, 14.34, 14.21
See application file for complete search history.

(56) References Cited

U.S. PATENT DOCUMENTS

| | | | |
|---|---|---|---|
| 6,529,880 B1* | 3/2003 | McKeen et al. | 705/17 |
| 6,868,393 B1* | 3/2005 | Demsky et al. | 705/26 |
| 2001/0011250 A1* | 8/2001 | Paltenghe et al. | 705/41 |
| 2002/0073042 A1* | 6/2002 | Maritzen et al. | 705/64 |
| 2002/0095303 A1* | 7/2002 | Asayama et al. | 705/1 |
| 2003/0204449 A1* | 10/2003 | Kotas et al. | 705/27 |
| 2004/0225567 A1* | 11/2004 | Mitchell et al. | 705/16 |
| 2008/0046747 A1* | 2/2008 | Brown et al. | 713/182 |

OTHER PUBLICATIONS

The website www.cpgmatters.com/coupons0407.html from Apr. 2007.*

* cited by examiner

*Primary Examiner*—Jason B Dunham
*Assistant Examiner*—Courtney Stopp
(74) *Attorney, Agent, or Firm*—Osha • Liang LLP (57) ABSTRACT

In general, the invention relates to a method of tracking purchases for a consumer using a unique identifier associated with the consumer. The method includes receiving first itemized data and the unique identifier from a first merchant system of a first merchant, where the first itemized data includes each item purchased in a first transaction associated with the consumer. The method further includes receiving second itemized data and the unique identifier from a second merchant system of a second merchant, where the second itemized data includes each item purchased in a second transaction associated with the consumer. The method further includes storing the first itemized data and the second itemized data based on the unique identifier to obtain aggregated itemized data, where the aggregated itemized data is categorized at an item level.

22 Claims, 7 Drawing Sheets

METHOD AND SYSTEM FOR TRACKING PURCHASES

BACKGROUND

Commonly when interacting with a merchant, a consumer is provided with information related to the transaction between the merchant and the consumer. Specifically, the merchant may provide a receipt for the transaction to the consumer. Typically, the receipt includes information such as the amount of funds transferred in the transaction, the items exchanged in the transaction, and information related to the method of payment.

Historically, a consumer would collect paper receipts for all the consumer's transactions with merchants in order to track the consumer's purchase history. However, with the advent of modern payment methods (e.g., credit cards, debit cards, etc.), a consumer's transactions using a particular payment method may be tracked automatically. For example, an entry for a credit card transaction includes information such as the amount of funds transferred and the location at which the funds were transferred. In this case, the consumer may review his credit card transactions on a monthly statement or via an online service associated with the credit card.

In some cases, a merchant may also keep a separate record of transactions with consumers. However, the merchant typically tracks transactions only for the merchant's use and does not share the information with consumers or other merchants. For example, the merchant may track a consumer's purchases in order to provide the consumer with offers relevant to the consumer's purchasing habits.

SUMMARY

In general, in one aspect, the invention relates to a method of tracking purchases for a consumer using a unique identifier associated with the consumer. The method includes receiving first itemized data and the unique identifier from a first merchant system of a first merchant, where the first itemized data includes each item purchased in a first transaction associated with the consumer. The method further includes receiving second itemized data and the unique identifier from a second merchant system of a second merchant, where the second itemized data includes each item purchased in a second transaction associated with the consumer. The method further includes storing the first itemized data and the second itemized data based on the unique identifier to obtain aggregated itemized data, where the aggregated itemized data is categorized at an item level.

In general, in one aspect, the invention relates to a system for tracking purchases of a consumer using a unique identifier associated with the consumer. The system includes a merchant interface configured to receive first itemized data and the unique identifier from a first merchant system of a first merchant, where the first itemized data includes each item purchased in a first transaction associated with the consumer, and receive second itemized data and the unique identifier from a second merchant system of a second merchant, where the second itemized data includes each item purchased in a second transaction associated with the consumer. The system further includes a tracking module configured to store the first itemized data and the second itemized data based on the unique identifier to obtain aggregated itemized data, where the aggregated itemized data is categorized at an item level.

In general, in one aspect, the invention relates to a computer readable medium, embodying instructions executable by the computer to perform method steps for tracking purchases of a consumer using a unique identifier associated with the consumer, the instructions including functionality to receive first itemized data and the unique identifier from a first merchant system of a first merchant, where the first itemized data includes each item purchased in a first transaction associated with the consumer. The instructions further include functionality to receive second itemized data and the unique identifier from a second merchant system of a second merchant, where the second itemized data includes each item purchased in a second transaction associated with the consumer. The instructions further include functionality to store the first itemized data and the second itemized data based on the unique identifier to obtain aggregated itemized data, where the aggregated itemized data is categorized at an item level.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method and a system for tracking purchases. More specifically, embodiments of the invention provide a method and system to track a consumer's transactions using a unique identifier associated with the consumer, where the transactions are tracked on an item level. Further, the consumer's transactions with a number of merchants may be tracked and consolidated for review by the consumer.

Figure 1:
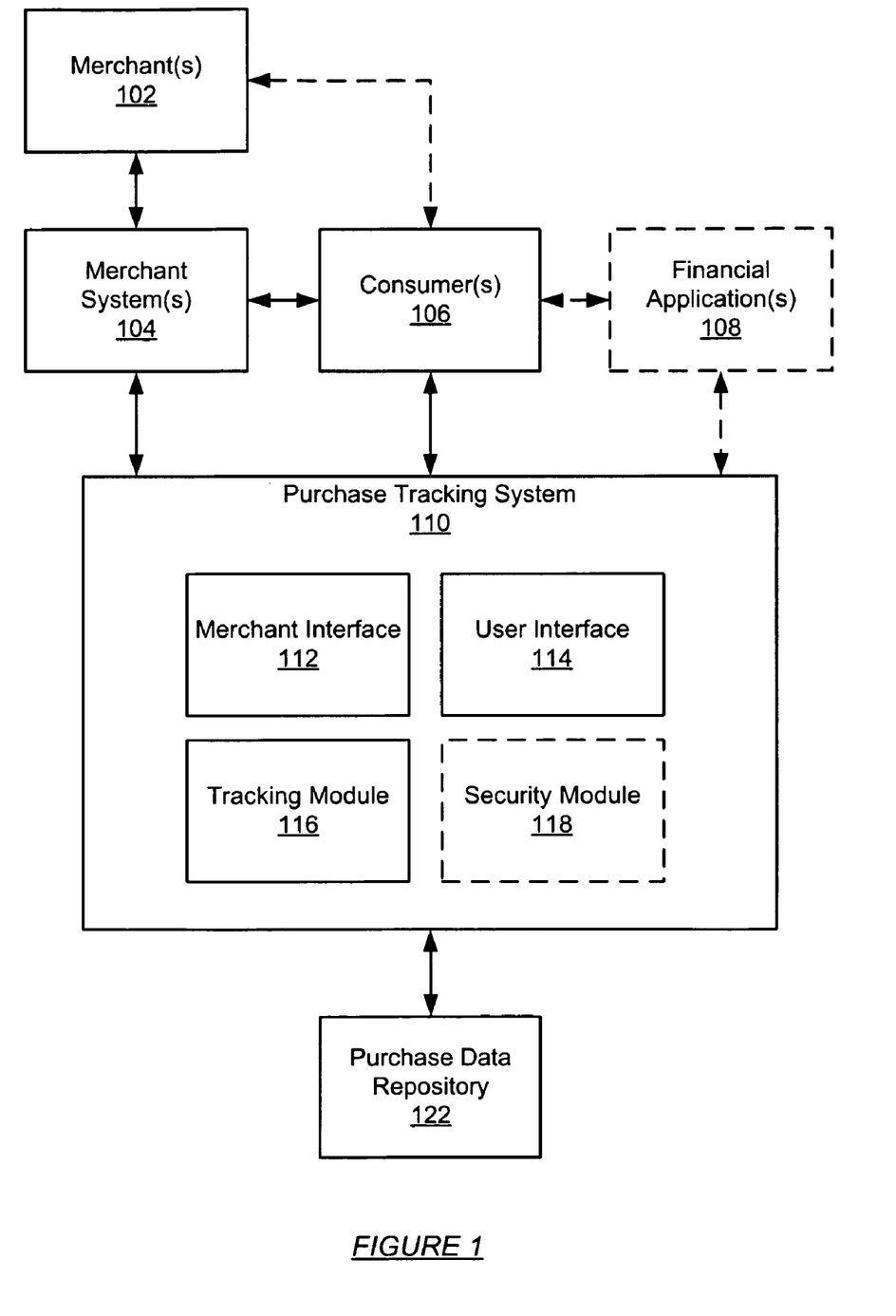
FIG. 1 shows a system in accordance with one or more embodiments of the invention.

FIG. 1 shows a system for collecting information in accordance with one or more embodiments of the invention. The system includes a purchase tracking system (110) interacting with merchant system(s) (104), consumer(s) (106), and a purchase data repository (122). The merchant system(s) (104) further interact with merchant(s) (102) and the consumer(s) (106). The consumer(s) (106) further interact with the merchant(s) (102). The purchase tracking system (110) further includes a merchant interface (112), a user interface (114), a tracking module (116), and a security module (118). Each of the aforementioned components of FIG. 1 is described below.

In one or more embodiments of the invention, the merchant(s) (102) may interact with merchant system(s) (104). The merchant(s) (102) may be any professional entity participating in the trade of goods and services. More specifically, a merchant (102) may be a retailer that sells items of merchandise to consumer(s) (106). Those skilled in the art will appreciate that a merchant (102) may also refer to an agent of the retailer. Further, each merchant (102) may be associated with any number of merchant system(s) (104). For example, a merchant (102) may operate a number of merchant systems (104), where each merchant system (104) is located at a point of sale. The merchant system(s) (104) may be a variety of point of sale systems used in the sale of merchandise. For example, a merchant system (104) may include a number of registers at a retail store, where the registers communicate with a central control unit. In this example, the central control unit may be configured to process transactions from each of the registers in the retail store.

Those skilled in the art will appreciate that each merchant (102) may be unaffiliated with the other merchants (102) in the system. Said another way, each merchant (102) may correspond to a different retailer associated with a different set of retail stores (i.e., points of sale) and corresponding merchant systems (104).

In one or more embodiments of the invention, the merchant system(s) (104) may also be configured to interact with the consumer(s) (106). More specifically, the merchant system(s) (104) may be configured to process transactions associated with consumer(s) (106). For example, the merchant system(s) (104) may be configured to accept payment for items of merchandise from the consumer(s) (104). Those skilled in the art will appreciate that payment may be accepted by a variety of methods (e.g., cash payment method, credit card payment method, debit card payment method, etc.). In another example, the merchant system(s) (104) may be configured to accept a unique identifier from consumer(s) (104). In this example, the unique identifier may be obtained from the consumer(s) (104) by a variety of methods (e.g., from a merchant shopping card associated with the consumer, the consumer manually entering an identification number, etc.). Optionally, each merchant system (104) may be configured to store data associated with a consumer (106) in a consumer merchant account. More specifically, the merchant system (104) may store data associated with a consumer's (106) transactions in the consumer merchant account. The consumer merchant account may be used by the merchant system (104) to provide a variety of services (e.g., special offers based on the consumer's purchase habits, a rewards program, etc.) to the consumer (106).

In one or more embodiments of the invention, the merchant system(s) (104) may also be configured to interact with the purchase tracking system (110). More specifically, the merchant system(s) (104) may be configured to access the purchase tracking system (110) when processing transactions associated with consumer(s) (106). For example, the merchant system(s) (104) may be configured to send itemized data and/or a unique identifier to the purchase tracking system (110). In another example, the merchant system(s) (104) may be configured to request data (e.g., consumer merchant account data, verification of a unique identifier, etc.) from the purchase tracking system (110).

Optionally, in one or more embodiments of the invention, transactions processed by a merchant system (104) may be paperless transactions. In the case where the merchant system (104) receives a unique identifier for a consumer (106), the merchant system (104) may be configured to generate an electronic purchase receipt when processing the transaction. In this case, the electronic purchase receipt may be included in the itemized data provided to the purchase tracking system (110). The electronic purchase receipt may be an electronic representation of a physical purchase receipt. For example, the electronic purchase receipt may include images representing both sides of a physical purchase receipt.

In one or more embodiments of the invention, the purchase tracking system (110) may be configured to interact with the merchant system(s) (106) using a merchant interface (112). More specifically, the merchant interface (112) may be configured to receive itemized data from the merchant system(s) (104). Itemized data associated with a transaction may specify, but is not limited to, a consumer (106), an amount of funds transferred in the transaction, a merchant (102), and/or each item purchased in the transaction.

In one or more embodiments of the invention, the purchase tracking system (110) may be configured to obtain and store data in the purchase data repository (122). The purchase data repository (122) may be a data store (e.g., a database, a file system, one or more data structures configured in a memory, an extensible markup language (XML) file, some other medium for storing data, or any suitable combination thereof), which may include data (e.g., log of purchase history requests, consumer data, itemized data, merchant data, etc.) related to purchase tracking.

In one or more embodiments of the invention, the purchase tracking system (110) may be configured to process itemized data using a tracking module (116). More specifically, the tracking module (116) may be configured to process itemized data based on a unique identifier. For example, the tracking module (116) may be configured to store the itemized data in the purchase data repository (122), where the stored itemized data may be categorized on an item level based on each purchased item included in the itemized data. In this case, an item level indicates that details (e.g., name of the merchandise, description of the merchandise, price of the merchandise, and/or type of the merchandise, etc.) regarding each item of merchandise purchased are included in the stored itemized data. Those skilled in the art will appreciate that the stored itemized data may also include a variety of other item level attributes (e.g., a merchant system (104) where the item of merchandise was purchased, merchant (102) associated with the merchandise, date the item of merchandise was purchased, etc.).

In one or more embodiments of the invention, the consumer(s) (106) may interact with the purchase tracking system (110). For example, the consumer(s) (106) may access the purchase tracking system (110) over the Internet (or other Wide Area Network or Local Area Network) through a web browser (or via another interface for communicating over a network). Alternatively, the consumer(s) (106) may interact with the purchase tracking system (110) through an application running natively on the consumer's (106) local computer (not shown). Further, in one or more embodiments of the invention, the purchase tracking system (110) may interact with the consumer(s) (106) through use of notifications. The notifications may be conveyed by electronic mail, short message service (SMS), or some other form of electronic correspondence.

Optionally, in one or more embodiments of the invention, the purchase tracking system (110) may be configured to send itemized data and/or unique identifier to financial application(s) (108) using the tracking module (116). The financial application(s) (108) may be any applications used by the consumer(s) (106) to manage financial data.

In one or more embodiments of the invention, the purchase tracking system (110) may be configured to interact with the consumer(s) (106) using a user interface (114). More specifically, the user interface (114) may be configured to present purchase histories to consumer(s) (106). For example, a consumer (106) may request to view a purchase history for the consumer's (106) purchases in the last month. In this example, the user interface (110) may process the request to obtain itemized data associated with the consumer (106) from the purchase data repository (122). The user interface (110) may then use the itemized data to generate a purchase history for presenting to the consumer (106). Those skilled in the art will appreciate that consumer(s) (106) may request purchase histories based on a variety of criteria (e.g., a specified merchant (102), a specified date range, a specified category of merchandise, a geographic region, etc.).

Optionally, in one or more embodiments of the invention, the purchase tracking system (110) may further include a security module (122). The security module (122) may be configured to secure interactions with the merchant system(s) (104). More specifically, the security module (122) may be configured to authenticate communication from the merchant system(s) (104) based on security keys verifying the identity of the source of the communication. For example, a merchant system (104) may be associated with a security key allowing the merchant system (104) to interact with the merchant interface (122). Further, the security module (122) may be configured to restrict requests for consumer merchant account data based on the security keys. For example, the security module (122) may only fulfill requests for consumer merchant account data from a merchant system (104) associated with the corresponding consumer merchant account.

Figure 2:
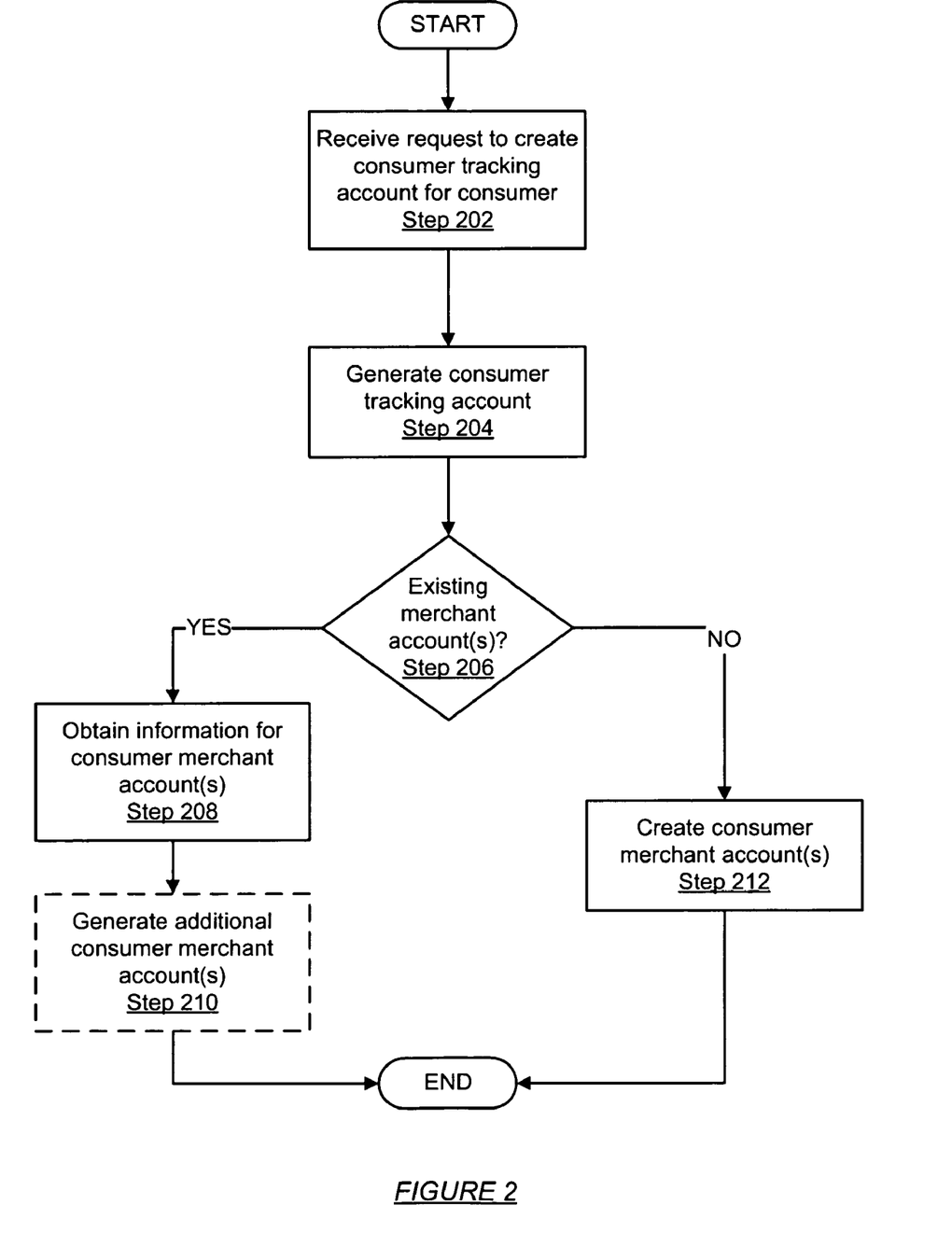
FIGS. 2-4 show flow charts in accordance with one or more embodiments of the invention.

FIG. 2 shows a flow chart for creating a consumer tracking account in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 202, a request to create a consumer tracking account for a consumer is received. Those skilled in the art will appreciate that the request to create the consumer tracking account may originate from a variety of sources (e.g., a merchant system, the consumer, etc.). The request may include, but is not limited to, consumer information and/or merchant information.

In Step 204, the consumer tracking account for the consumer is generated. In one or more embodiments of the invention, the consumer tracking account is for tracking the payment history of the consumer. More specifically, the consumer tracking account is configured to track the consumer's transactions with merchants.

At this stage, a determination is made as to whether consumer merchant accounts associated with the consumer exist (Step 206). More specifically, a determination is made as to whether the consumer has a consumer merchant account, if required by the corresponding participating merchant, with each participating merchant. Participating merchants may be merchants associated with merchant systems that are capable of interacting with a purchase tracking system as described with respect to FIG. 1. Those skilled in the art will appreciate that the determination as to whether a consumer merchant account exists for each participating merchant may be performed using a variety of information associated with the consumer (e.g., name of the consumer, address of the consumer, phone number of the consumer, and/or some other information associated with the consumer).

Optionally, in one or more embodiments of the invention, the request to create a consumer tracking account may specify a number of merchants that are believed to have a consumer merchant account for the consumer. In this case, if consumer merchant accounts are not found for the specified merchants, the originator of the request to create the consumer tracking account may be required to specify additional consumer information.

Continuing with FIG. 2, if consumer merchant accounts for the consumer do not exist, consumer merchant accounts are created (Step 212). More specifically, a consumer merchant account may, if required by the corresponding participating merchant, be created for each participating merchant. Further, each consumer merchant account created is associated with the consumer tracking account for the consumer. Those skilled in the art will appreciate that all participating merchants may not require a consumer merchant account.

Alternatively, if consumer merchant accounts for the consumer do exist, data for the consumer merchant accounts may be obtained (Step 208). More specifically, data for each consumer merchant account may be obtained from a corresponding merchant system of a participating merchant. The data for a consumer merchant account may include, but is not limited to, a consumer merchant account identifier, merchant information, and/or balance of the consumer merchant account. Each of the consumer merchant accounts may then be associated with the consumer tracking account for the consumer.

Optionally, at this stage, additional consumer merchant accounts may be created (Step 210). More specifically, additional consumer merchant accounts may, if required by the corresponding participating merchant, be created for the participating merchants not addressed in Step 208. Similarly, each of the additional consumer merchant accounts may then be associated with the consumer tracking account for the consumer.

Figure 3:
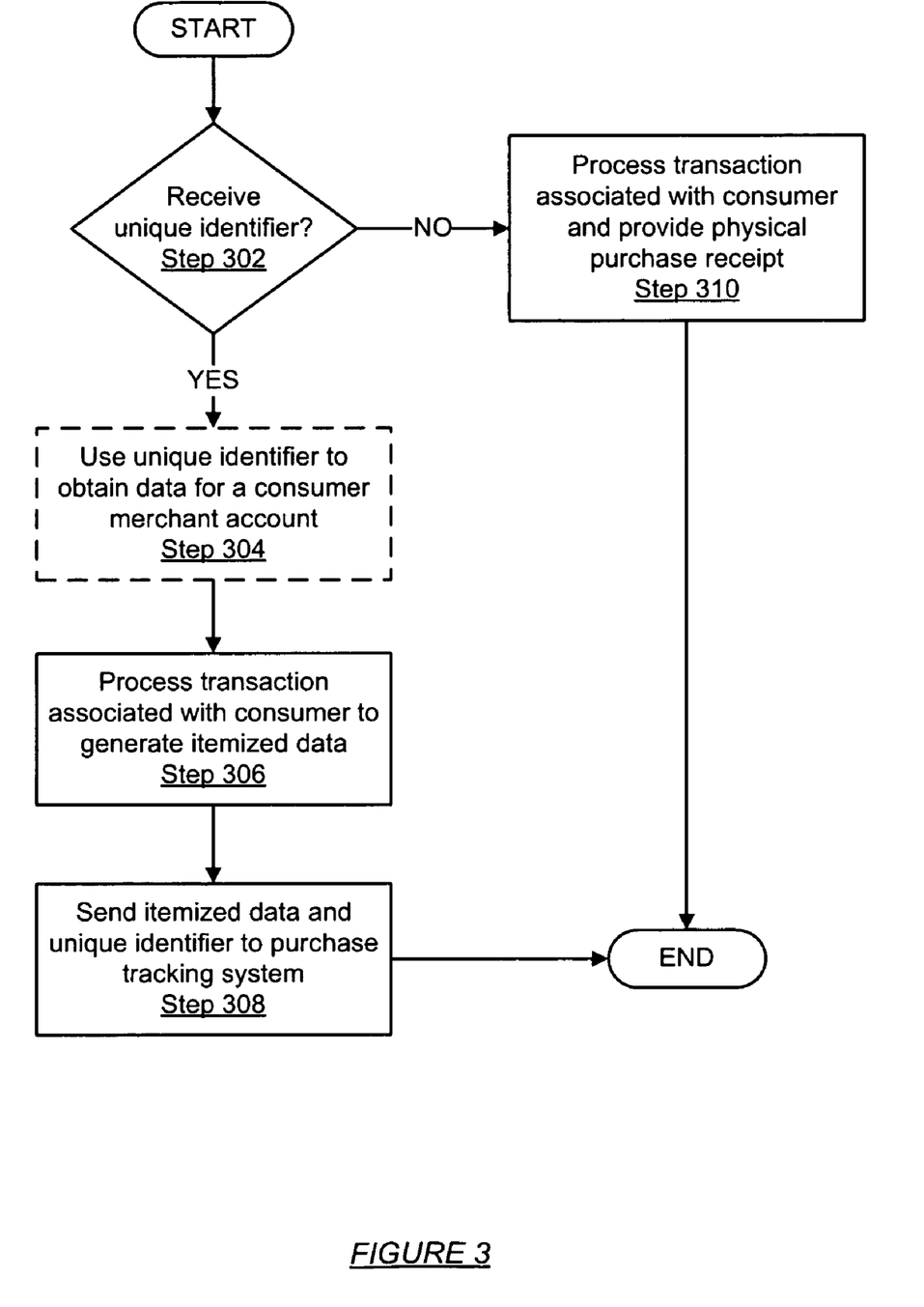

FIG. 3 shows a flow chart for processing transactions in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 302, a determination is made as to whether a unique identifier has been received. In one or more embodiments of the invention, the unique identifier is received from the consumer. For example, the unique identifier may be embedded on a shopping card associated with the consumer. In another example, the consumer may manually enter an identification number associated with the unique identifier.

If a unique identifier is not received, a transaction associated with the consumer may be processed (Step 310). More specifically, a merchant system may accept payment from the consumer for the transaction and then provide a physical purchase receipt to the consumer. Those skilled in the art will appreciate that the merchant system may accept payment from the consumer via a variety of methods (e.g., cash payment, credit card payment, debit card payment, etc.).

Optionally, if a unique identifier is received, the unique identifier may be used to obtain data for a consumer merchant account associated with the consumer (Step 304). In this case, the unique identifier may be used to obtain the data for the consumer merchant account associated with the consumer. For example, the data for the consumer merchant account may be obtained from the merchant system based on the unique identifier. In another example, the data for the consumer merchant account may be obtained from a purchase tracking system using the unique identifier.

In Step 306, if a unique identifier is received, a transaction associated with the consumer is processed to generate itemized data. More specifically, a merchant system may accept payment from the consumer for the transaction and then generate the itemized data. The itemized data may include, but is not limited to, consumer information, an amount of funds transferred in the transaction, merchant information, an electronic purchase receipt, and/or each item purchased in the transaction. Those skilled in the art will appreciate that the merchant system may accept payment from the consumer via a variety of methods (e.g., cash payment, credit card payment, debit card payment, etc.). In one or more embodiments of the invention, the transaction may be processed as a paperless transaction. In the case of a paperless transaction, the merchant system does not provide a physical receipt associated with the transaction to the consumer. In lieu of a physical receipt, the merchant system generates an electronic purchase receipt, which is included in the itemized data. The electronic purchase receipt included in the itemized data may be an electronic representation of the physical receipt. Those skilled in the art will appreciate that the option to process transactions as paperless transactions may be configurable by the consumer.

In Step 308, the itemized data and the unique identifier are sent to a purchase tracking system. In one or more embodiments of the invention, the purchase tracking system is as described with respect to FIG. 1.

Figure 4:
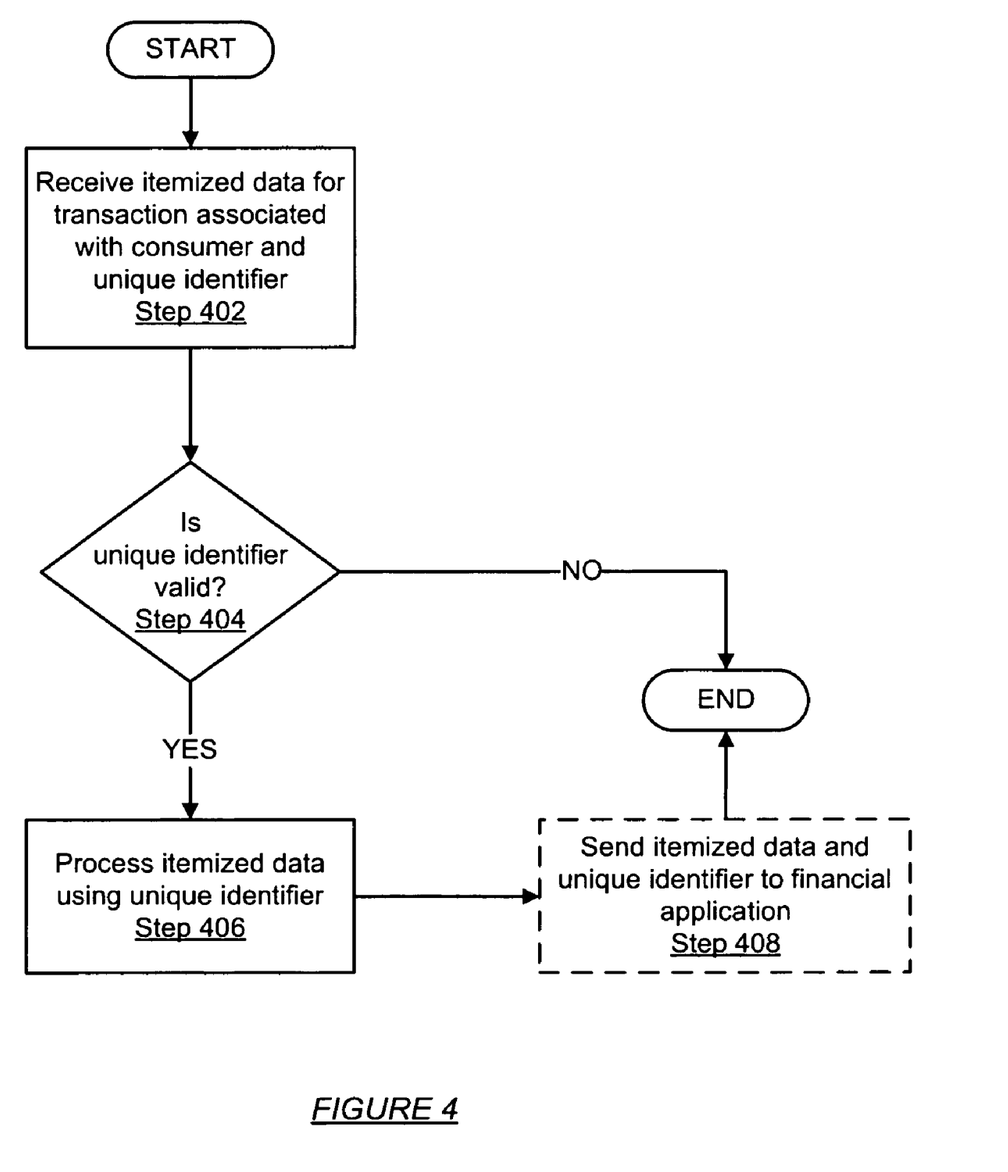

FIG. 4 shows a flow chart for tracking purchases in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

In Step 402, itemized data and a unique identifier for a transaction associated with a consumer are received. In one or more embodiments of the invention, the transaction was processed at a merchant system as discussed with respect to FIG. 3.

At this stage, a determination is made as to whether the unique identifier is valid (Step 404). More specifically, a determination is made as to whether a valid consumer tracking account associated with the unique identifier exists. In this case, the unique identifier may be used to verify that a valid consumer tracking account exists for the consumer. If the unique identifier is not valid, the process may end.

If the unique identifier is valid, the itemized data may be processed using the unique identifier (Step 406). The itemized data may include, but is not limited to, consumer information, an amount of funds transferred in the transaction, merchant information, an electronic purchase receipt, and/or each item purchased in the transaction. More specifically, processing the itemized data may include storing each item purchased in the transaction based on the unique identifier for the consumer. For example, an entry for each item of merchandise purchased in the transaction may be stored and associated with the consumer. Further, each entry may specify a variety of attributes including, but not limited to, a type of merchandise, a merchant associated with the transaction, a date the item of merchandise was purchased, a price of the merchandise, a name of the merchandise, and/or a description of the merchandise.

Those skilled in the art will appreciate that Steps 402-406 may be repeated for any number of transactions associated with the consumer. In this case, the itemized data for each of the transactions may be aggregated to be associated with the consumer.

In one or more embodiments of the invention, a number of consumers may be associated as members of a group (e.g., family, business unit, etc.). Entries for items of merchandise purchased by members of the group may be associated with the group (i.e., a group attribute). In this case, a consumer that is a member of the group may have access to itemized data for the other consumers associated with the group.

Those skilled in the art will appreciate that the stored itemized data may be configured to be categorized at the item level. More specifically, the stored itemized data may be configured to be categorized based on any combination of the attributes included in the entries as discussed above. For example, stored itemized data may be obtained based on criteria including any number of the attributes. Further, the stored itemized data may be sorted and/or grouped based on any number of the attributes.

Optionally, at this stage, the itemized data and unique identifier may be transmitted to a financial application (Step 408). The financial application may be any application used by the consumer to manage financial data. The itemized data may then be stored for use by the financial application. For example, the financial application may generate purchase entries based on the itemized data, where the purchase entries are for accounting for the expenses of the consumer. In another example, the financial application may recommend tax exemptions to the consumer based on the purchases in the itemized data.

Figure 5:
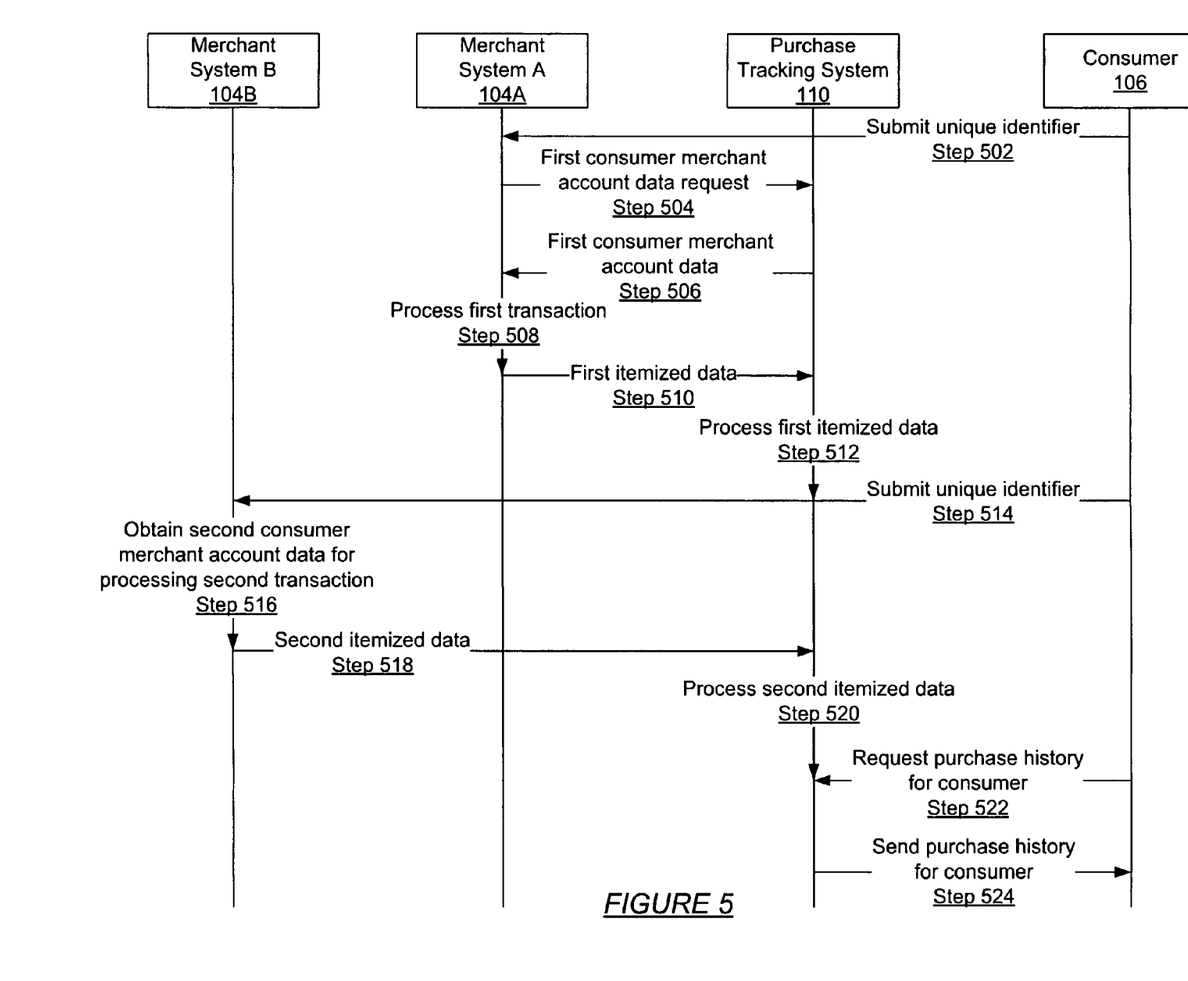
FIG. 5 shows a flow diagram in accordance with one or more embodiments of the invention.

FIG. 5 shows a flow diagram for tracking purchases in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

In Step 502, a consumer (106) submits a unique identifier to a merchant system A (104A) using a shopping card. More specifically, a unique identifier associated with the consumer (106) may be embedded on the shopping card. In this case, the consumer (106) submits the unique identifier by scanning the shopping card at a console of the merchant system A (104A).

In Step 504, the merchant system A (104A) sends a request to a purchase tracking system (110) for first consumer merchant account data. The request for the first consumer merchant account data may include the unique identifier associated with the consumer (106). In response to receiving the request for the first consumer merchant account data, the payment tracking system (110) obtains the first consumer merchant account data using the unique identifier associated with the consumer (106).

In Step 506, the merchant system A (104A) receives the first consumer merchant account data from the payment tracking system (110). The first consumer merchant account data identifies a first consumer merchant account associated with the merchant system A (104A) and the consumer (106).

Next, the merchant system A (104A) processes the first transaction (Step 508). More specifically, the processing of the first transaction by the merchant system A (104A) includes generating first itemized data based on the first transaction and crediting the first consumer merchant account based on the first transaction. The first itemized data specifies a merchant A associated with the merchant system A (104A), the amount of funds transferred in the first transaction, the date of the first transaction, and each item purchased in the first transaction. In addition, the first transaction may be a paperless transaction as described with respect to FIGS. 1 and 3.

In Step 510, the merchant system A (104A) sends the first itemized data to the purchase tracking system (110). In response to receiving the first itemized data, the purchase tracking system (110) processes the first itemized data (Step

512). More specifically, an entry may be generated for each item purchased in the first transaction as described with respect to Step 406 of FIG. 4.

In Step 514, a consumer (106) submits the unique identifier to a merchant system B (104B) by manually entering the unique identifier using a console of the merchant system B (104B). More specifically, the consumer (106) enters the unique identifier associated with the consumer (106) or some other consumer information (e.g., phone number) that may be used to obtain the unique identifier associated with the consumer (106).

Next, the merchant system B (104B) may obtain second consumer merchant account data for processing the second transaction (Step 516). More specifically, the merchant system B (104B) may obtain second consumer merchant account data using the unique identifier associated with the consumer (106). In this case, the merchant system B (104B) has previously received consumer merchant account data from the purchase tracking system (110). For example, the purchase tracking system (110) may send consumer merchant account data to the merchant system B (104B) based on a schedule (e.g., daily, weekly, monthly, etc.). In this example, if consumer merchant account data cannot be obtained locally at the merchant system B (104B), the merchant system B (104B) may obtain the consumer merchant account data directly from the purchase tracking system (110) as discussed above with respect to Steps 504-506. The second consumer merchant account data identifies a second consumer merchant account associated with the merchant system B (104B) and the consumer (106).

Once the second consumer merchant account data is obtained, the merchant system B (104B) may process the second transaction. More specifically, the processing of the second transaction by the merchant system B (104B) includes generating second itemized data based on the second transaction and crediting the second consumer merchant account based on the second transaction. The second itemized data specifies a merchant B associated with the merchant system B (104B), the amount of funds transferred in the second transaction, the date of the second transaction, and each item purchased in the second transaction. The second transaction may be a paperless transaction as described with respect to FIGS. 1 and 3.

Next, the merchant system B (104B) sends the second itemized data to the purchase tracking system (110) (Step 518). In response to receiving the second itemized data, the purchase tracking system (110) processes the second itemized data (Step 520). More specifically, an entry may be generated for each item purchased in the second transaction as described with respect to Step 406 of FIG. 4.

In Step 522, the consumer (106) may send a request for a purchase history for the consumer (106) to the purchase tracking system (110). The request for the purchase history may include a variety of criteria (e.g., a specified merchant, a specified date range, a specified type of merchandise, a geographic region, etc.). In response to receiving the request for the purchase history, the purchase tracking system (110) generates a purchase history including the stored first itemized data and the stored second itemized data.

In Step 524, the purchase tracking system (110) presents the purchase history to the consumer (106). The purchase history may be presented on a graphical user interface as discussed with respect to FIG. 6. In another example, the purchase history may be sent to the consumer (106) in an electronic correspondence as discussed with respect to FIG. 1.

Figure 6:
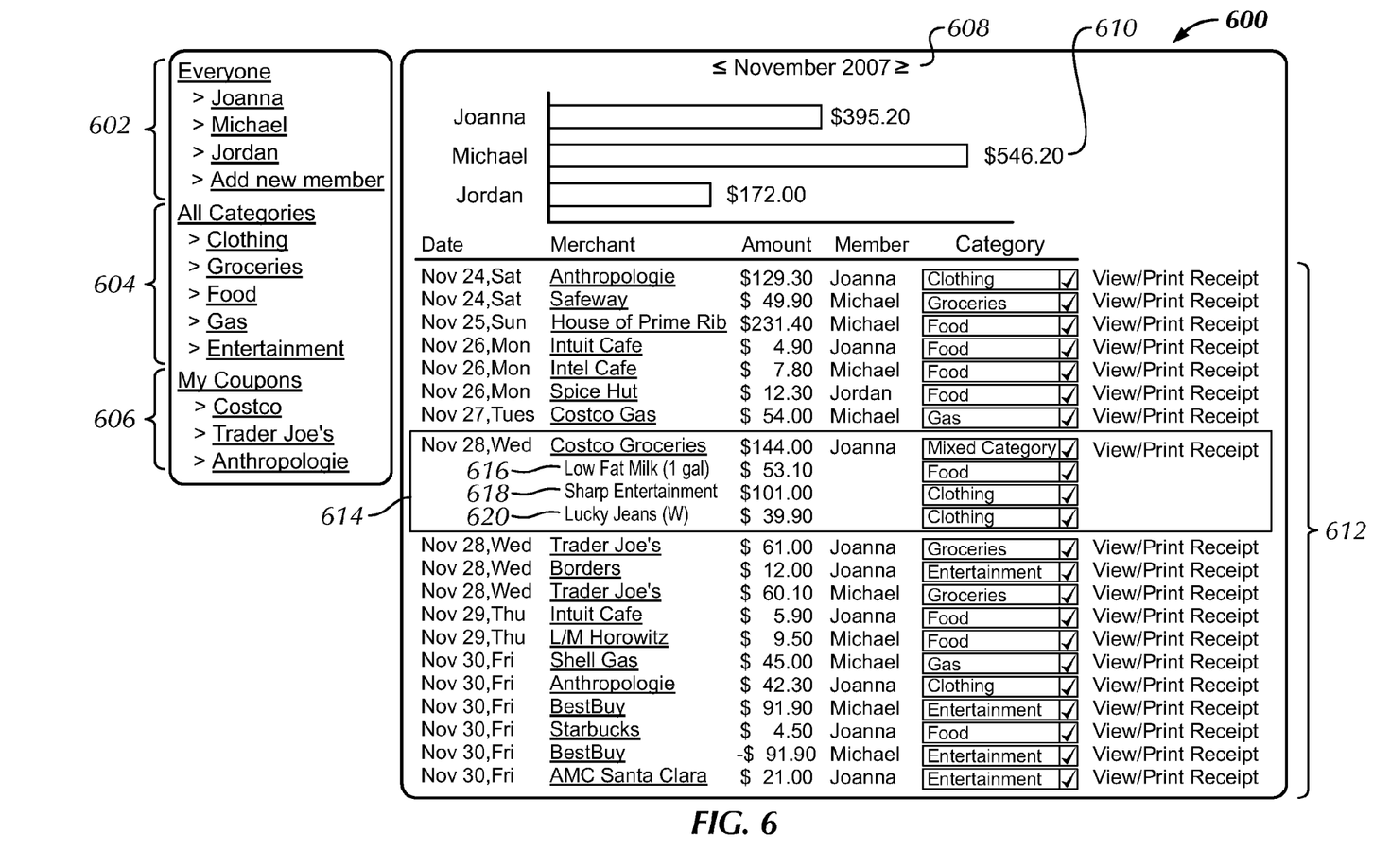
FIG. 6 shows a diagram of a graphical user interface in accordance with one or more embodiments of the invention.

FIG. 6 depicts a graphical user interface (GUI) in accordance with one embodiment of the invention. More specifically, the example depicts a purchase history interface (600) for presenting purchase histories as described above with respect to FIGS. 1 and 5. Those skilled in the art will appreciate that the following example is provided for exemplary purposes only and accordingly should not be construed as limiting the scope of the invention.

The purchase history interface (600) includes a list of consumers (602) associated with a group. The list of consumers (602) allows a user to request that a purchase history for a specific consumer of the group be generated, where the user is a consumer associated with the group. The purchase history interface (600) further includes a list of categories of merchandise (604). Those skilled in the art will appreciate that any number of categories (e.g., clothing, groceries, food, gas, entertainment, etc.) may be included in the list of categories of merchandise (604). The list of categories of merchandise (604) allows the user to request that a purchase history for a specific category of merchandise be generated. The purchase history interface (600) may allow a user to specify both a group and a category of merchandise for generating a purchase history. Those skilled in the art will appreciate that a variety of options (e.g., group, consumer, category of merchandise, date range, amount of funds, etc.) may be presented for selection by the user in a request for a purchase history.

The purchase history interface (600) further includes a list of merchant coupons (606). The list of merchant coupons (606) may allow the user to view merchant specific offers. For example, the user may receive offers from a merchant based on a balance of a consumer merchant account associated with the user and the merchant. In this example, the offers may be viewed by selecting the merchant from the list of merchant coupons (606).

The purchase history interface (600) further includes a date selection control (608). The date selection control (608) allows the user to request that a purchase history for a specified date range be generated. The purchase history interface (600) further includes a group comparison component (610). In the case where the user is a member of a group, a purchase summary for the group may be displayed in the group comparison component (610). In this example, the purchase summary specifies the total amount of funds used in transactions by each consumer in the group.

Based on the selections of the user, a list of transactions (612) may be presented in the purchase history interface (600). The list of transactions (612) corresponds to a purchase history generated as discussed with respect to Steps 522-524 of FIG. 5. Each entry in the list of transactions (612) may specify a variety of attributes (e.g., date of the transaction, merchant associated with the transaction, amount of funds transferred in the transaction, consumer associated with the transaction, categories of merchandise associated with the transaction, a reference to an electronic purchase receipt associated with the transaction, etc.).

If the user selects transaction in the list of transactions (612), a detailed list of merchandise (614) for the selected transaction may be displayed. The detailed list of merchandise (614) further includes an entry for each item of merchandise purchased (616, 618, 620) in the selected transaction. Each entry for an item of merchandise (616, 618, 620) may specify a variety of attributes (e.g., name of the merchandise, price of the merchandise, category of the merchandise, etc.).

Figure 7:
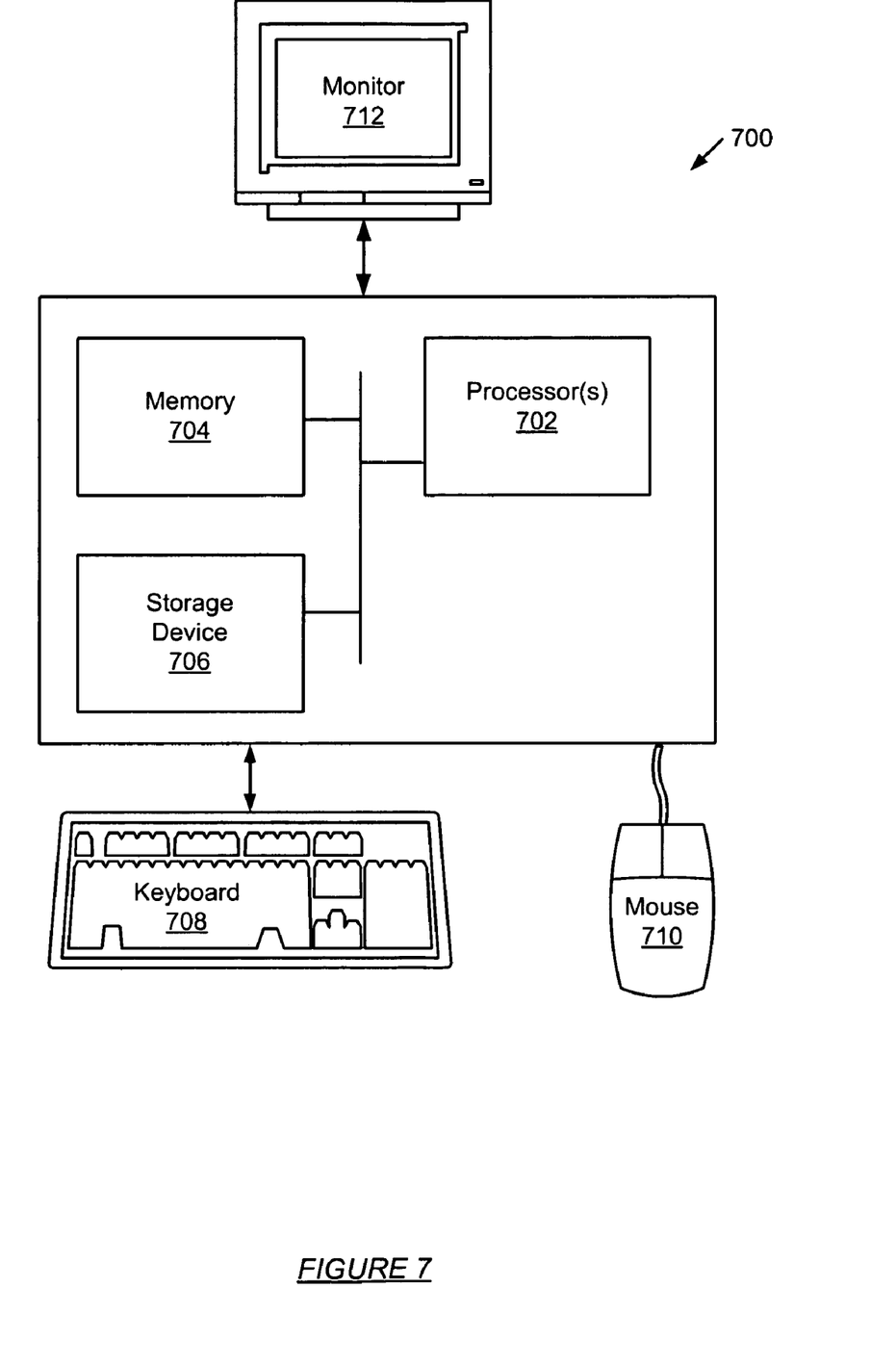
FIG. 7 shows a computer system in accordance with one or more embodiments of the invention.

Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computers (not shown). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (500) may be connected to a network (714) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (for example, a merchant system, a tracking module, a merchant interface, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of tracking purchases for a consumer using a unique identifier associated with the consumer, comprising:
    receiving a first plurality of item details and the unique identifier from a first merchant system of a first merchant,
        wherein the first merchant system comprises a first computer processor, and
        wherein each of the first plurality of item details comprises an item description and an item price for one of a first plurality of items purchased in a first transaction of the consumer;
    obtaining a balance of the consumer with the first merchant from the first merchant system;
    receiving a second plurality of item details and the unique identifier from a second merchant system of a second merchant,
        wherein the second merchant system comprises a second computer processor,
        wherein the first merchant is not affiliated with the second merchant, and
        wherein each of the second plurality of item details comprises an item description and an item price for one of a second plurality of items purchased in a second transaction of the consumer; and
    storing, in a purchase data repository, the first plurality of item details and the second plurality of item details using the unique identifier to obtain a plurality of aggregated item details;
    categorizing, at an item level, each of the plurality of aggregated item details within the purchase data repository to obtain a plurality of categorized item details;
    sending, to a financial application of the consumer, the plurality of categorized item details, wherein the consumer uses the financial application to access the plurality of categorized item details; and
    sending, to the financial application of the consumer, a coupon offer from the first merchant based on the balance of the consumer with the first merchant.

2. The method of claim 1, wherein the financial application presents a purchase history comprising the plurality of categorized item details.

3. The method of claim 1, further comprising:
    receiving a verification request comprising the unique identifier from the first merchant system; and
    sending verification that the unique identifier is valid to the first merchant system.

4. The method of claim 1, wherein each of the first transaction and the second transaction uses a cash payment method.

5. The method of claim 1, wherein each of the first transaction and the second transaction uses a payment method selected from a group consisting of a cash payment method, a credit card payment method, and a debit card payment method.

6. The method of claim 1, wherein the unique identifier is stored on an external device for use by the consumer.

7. The method of claim 1, wherein each of the first transaction and the second transaction is a paperless transaction.

8. The method of claim 7, wherein the first transaction further comprises an electronic purchase receipt, wherein the electronic purchase receipt is an electronic representation of a physical purchase receipt.

9. A system for tracking purchases of a consumer using a unique identifier associated with the consumer, comprising:
    a merchant interface configured to:
        receive a first plurality of item details and the unique identifier from a first merchant system of a first merchant,
            wherein the first merchant system comprises a first computer processor, and
            wherein each of the first plurality of item details comprises an item description and an item price for one of a first plurality of items purchased in a first transaction of the consumer,
        obtain a balance of the consumer with the first merchant from the first merchant system, and
        receive a second plurality of item details and the unique identifier from a second merchant system of a second merchant,
            wherein the second merchant system comprises a second computer processor,
            wherein the first merchant is not affiliated with the second merchant, and
            wherein each of the second plurality of item details comprises an item description and an item price for one of a second plurality of items purchased in a second transaction of the consumer; and
    a tracking module executing on a computer system and configured to:

store, in a purchase data repository, the first plurality of item details and the second plurality of item details using the unique identifier to obtain plurality of aggregated item details;—categorize, at an item level, each of the plurality of aggregated item details within the purchase data repository to obtain a plurality of categorized item details;

send, to a financial application of the consumer, the plurality of categorized item details, wherein the consumer uses the financial application to access the plurality of categorized item details; and send, to the financial application of the consumer, a coupon offer from the first merchant based on the balance of the consumer with the first merchant.

10. The system of claim 9,
wherein the financial application presents a purchase history comprising the plurality of categorized item details.

11. The system of claim 9, wherein the merchant interface is further configured to:
receive a verification request comprising the unique identifier from the first merchant system; and
send verification that the unique identifier is valid to the first merchant system.

12. The system of claim 9, wherein each of the first transaction and the second transaction uses a cash payment method.

13. The system of claim 9, wherein each of the first transaction and the second transaction uses a payment method selected from a group consisting of a cash payment method, a credit card payment method, and a debit card payment method.

14. The system of claim 9, wherein unique identifier is stored on an external device for use by the consumer.

15. The system of claim 9, wherein each of the first transaction and the second transaction is a paperless transaction.

16. The system of claim 15, wherein the first transaction further comprises an electronic purchase receipt, wherein the electronic purchase receipt is an electronic representation of a physical purchase receipt.

17. A computer readable storage medium, embodying instructions executable by the computer to perform method steps for tracking purchases of a consumer using a unique identifier associated with the consumer, the instructions comprising functionality to:
receive a first plurality of item details and the unique identifier from a first merchant system of a first merchant,
wherein the first merchant system comprises a first computer processor,
wherein each of the first plurality of item details comprises an item description and an item price for one of a first plurality of items purchased in a first transaction of the consumer, and obtaining a balance of the consumer with the first merchant from the first merchant system, receive a second plurality of item details and the unique identifier from a second merchant system of a second merchant,
wherein the second merchant system comprises a second computer processor,
wherein the first merchant is not affiliated with the second merchant, and
wherein each of the second plurality of item details comprises an item description and an item price for one of a second plurality of items purchased in a second transaction of the consumer; and store, in a purchase data repository, the first plurality of item details and the second plurality of item details using the unique identifier to obtain a plurality of aggregated item details;—categorize, at an item level, each of the plurality of aggregated item details within the purchase data repository to obtain a plurality of categorized item details;

send, to a financial application of the consumer, the plurality of categorized item details, wherein the consumer uses the financial application to access the plurality of categorized item details; and send, to the financial application of the consumer, a coupon offer from the first merchant based on the balance of the consumer with the first merchant.

18. The computer readable storage medium of claim 17,
wherein the financial application presents a purchase history comprising the plurality of categorized item details.

19. The computer readable storage medium of claim 17, the instructions further comprising functionality to:
receive a verification request comprising the unique identifier from the first merchant system; and
send verification that the unique identifier is valid to the first merchant system.

20. The computer readable storage medium of claim 17, wherein
each of the first transaction and the second transaction uses a cash payment method.

21. The computer readable storage medium of claim 17, wherein each of the first transaction and the second transaction uses a payment method selected from a group consisting of a cash payment method, a credit card payment method, and a debit card payment method.

22. The computer readable storage medium of claim 17, wherein each of the first transaction and the second transaction is a paperless transaction.

* * * * *